Patented Jan. 19, 1926.

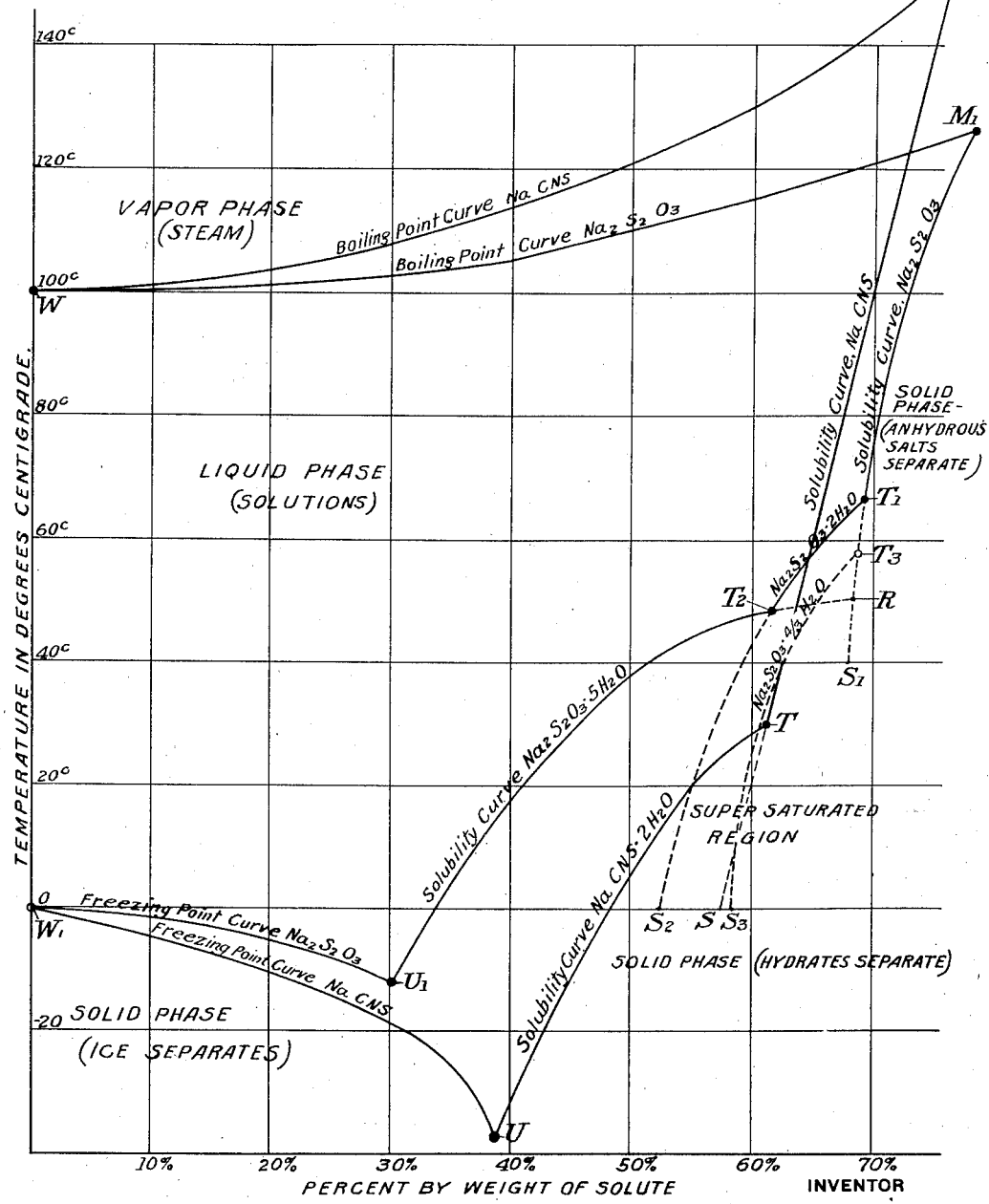

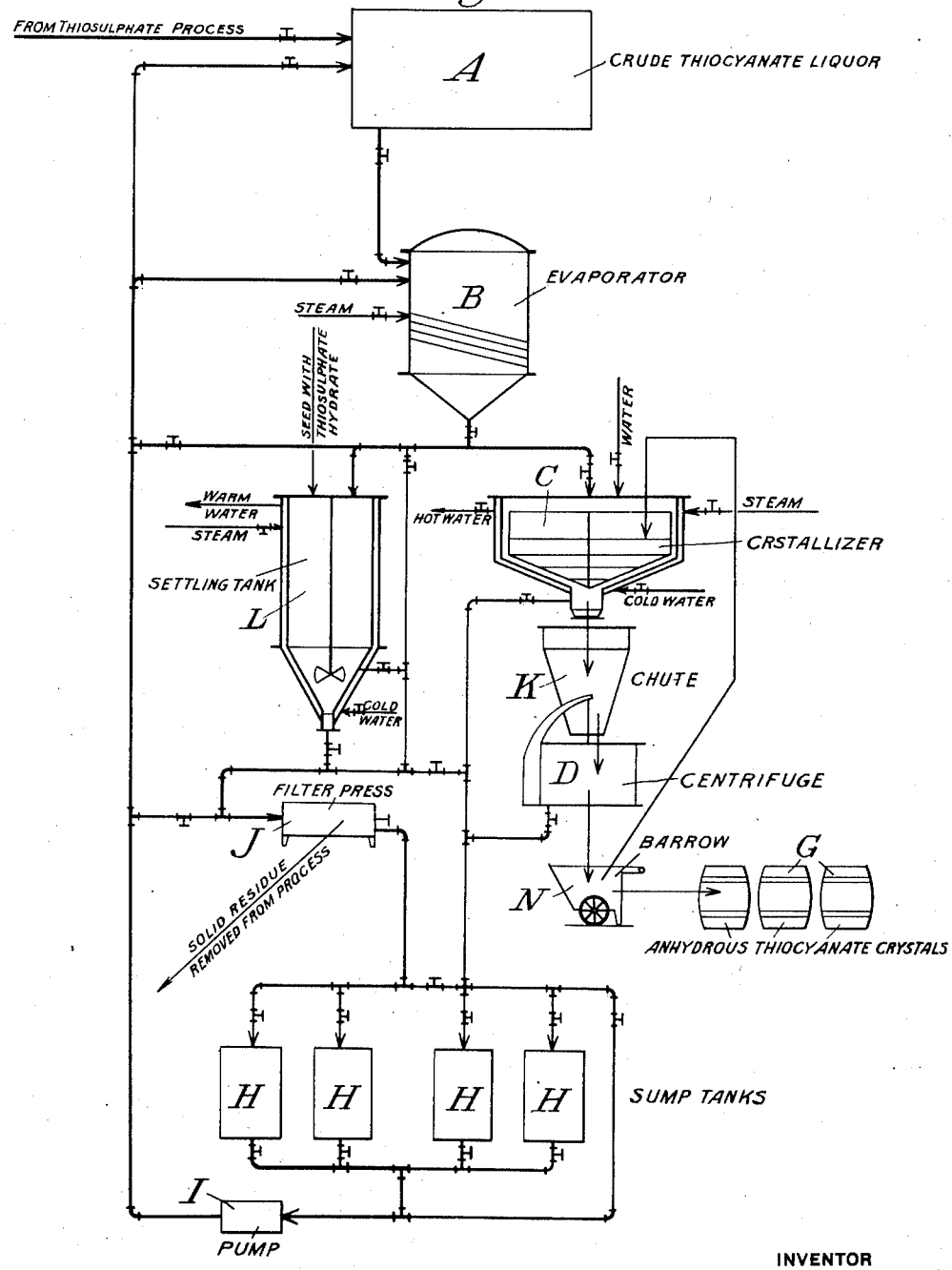

1,570,047

UNITED STATES PATENT OFFICE.

MARC DARRIN, OF WILKINSBURG, PENNSYLVANIA, ASSIGNOR TO THE KOPPERS COMPANY, OF PITTSBURGH, PENNSYLVANIA, A CORPORATION OF PENNSYLVANIA.

RECOVERY OF THIOCYANATES AND THIOSULPHATES.

Application filed January 16, 1923, Serial No. 612,919. Renewed June 11, 1925.

*To all whom it may concern:*

Be it known that I, MARC DARRIN, a citizen of the United States, residing at Wilkinsburg, in the county of Allegheny and State of Pennsylvania, have invented a new and useful Improvement in the Recovery of Thiocyanates and Thiosulphates, of which the following is a full, clear, and exact description, reference being had to the accompanying drawings, in which,—

Figure 1 is a graph showing the solubility and boiling point relations between sodium thiocyanate, sodium thiosulphate, and their more important hydrates; and Figure 2 is a schematic diagram of an apparatus for carrying out the process.

The present invention relates to the recovery of thiocyanates, and more especially to the recovery of sodium thiocyanate from solutions containing other salts or impurities, such, for example, as sodium thiosulphate, sodium carbonate, sodium bicarbonate, organic substances, sulphur compounds, iron compounds, colloidal matter, etc. It also relates to the separation of thiosulphates from certain solutions.

The object of the invention is to effect such recovery by economical and commercially operable processes. My process involves the selective crystallization of the thiocyanate and also the selective crystallization and removal of certain other salts and impurities. The process does not require the use of special solvents, such as alcohol, which have been heretofore used because of the solubility of the thiocyanates in alcohol. Neither does the process require evaporation of solutions to dryness. As will be apparent from the following description, the crystallizing operations required are exceedingly simple and can be carried out in an economical manner.

Sodium thiocyanate, NaCNS, is very soluble. Over 75% by weight is dissolved in water at the boiling temperature of the saturated solution, and about 61% by weight is dissolved in water at 30° C. Also, the sodium thiosulphate, $Na_2S_2O_3$, with which the sodium thiocyanate is usually associated in the liquors from gas purification, is very soluble. For this reason, various methods for the separation and recovery of the salts have involved the use of special solvents, such as alcohol, in which the thiocyanate is soluble but in which the thiosulphate is insoluble. The alcohol extraction methods are, however, expensive, due to the loss of alcohol and the necessity of auxiliary operations for its recovery and purification. Also, certain highly colored impurities are extracted by the alcohol together with the sodium thiocyanate and have to be removed by subsequent treatment.

The method of the present invention avoids evaporation to dryness of the salts. It removes the most persistent and finely divided impurities. It produces a finished product having a uniform crystalline form. It eliminates the building up of impurities in the final mother liquors.

I have discovered the following facts which I apply to the method of my invention:—

It is possible to heat a saturated solution of sodium thiocyanate to a temperature of approximately 150° C. before the solid phase NaCNS, starts to separate. On slowly cooling a solution of sodium thiocyanate saturated at its maximum boiling point, viz 153° C., an anhydrous salt separates in beautifully formed solid rhombic crystals of remarkable purity and less contaminated with entrapped mother liquor than is usually the case in crystals from solutions containing a very high percentage of solute. Sodium thiosulphate, which also has an unusually high maximum boiling point of 126° C., when present in small amounts in a concentrated thiocyanate solution, is partially precipitated at temperatures in the neighborhood of 130 to 135° C. On cooling such a solution which has been heated to a boiling point between 130 and 135° C., and which consequently contains a precipitate of finely divided anhydrous sodium thiosulphate in suspension, to a temperature below the transition point of the pentahydrate of the thiosulphate, viz about 48° C. and "seeding" with crystals of a hydrate of the thiosulphate, a gelatinous precipitate of the thiosulphate results. This gelatinous precipitate is believed to be the ⁴/₃ hydrate having the formula $3Na_2S_2O_3.4H_2O$. There are about thirteen crystalline forms of sodium thiosulphate, and it is possible that the gelatinous precipitate above referred to may be other or contains forms other than the $4/3$ hydrate. However, from my tests on this gelatinous precipitate, I believe it to be the $4/3$ hydrate, and for convenience will so designate it in the following description.

This gelatinous precipitate, although appearing very voluminous, as if it contained considerable solid substance, is in fact only a very small percentage of the total mass. On filtration, this sticky material carries with it all the finely divided impurities in the solution together with some of the soluble dark colored impurities, producing a clean filtrate which can be readily worked for the recovery of the thiocyanate as hereinafter described. The gelatinous precipitate appears to consist of very fine crystals of a hydrate of the thiosulphate. The rate of propagation of these crystals is very slow, partially due to the viscous properties which they impart to the solution. They are also in equilibrium with other hydrates of the thiosulphate capable of separating in hard crystalline form on prolonged standing. The viscous nature of the solution completely disappears above the transition point to the anhydrous salt. Stirring a solution in which the viscous crystalline structure has been started, will cause increased viscosity. The presence of this viscous material tends to retard the formation of the hydrate of sodium thiocyanate.

For convenience in explaining the phenomena, the solubility and boiling point relations between sodium thiocyanate, sodium thiosulphate, and their more important hydrates, are indicated by the graph in Figure 1, in which temperature in degrees centigrade is shown in ordinates, and concentrations in per cent. by weight as abscissæ. The curve WM is the boiling point curve for water solutions of sodium thiocyanate. MS is the solubility curve for anhydrous sodium thiocyanate. TU is the solubility curve for the hydrate of sodium thiocyanate, $NaCNS.2H_2O$. The intersection of MS and TU at T is the transition point between the anhydrous salt and the hydrate. TS represents the supersaturated solution of the anhydrous thiocyanate. $WM_1$ is the boiling point curve for water solutions of sodium thiosulphate. $M_1S_1$ is the solubility curve for anhydrous sodium thiosulphate; and $T_1S_2$ is the solubility curve for the dihydrate of sodium thiosulphate. The intersection point at $T_1$ is the transition point between the anhydrous salt and the dihydrate. $T_2U_1$ is the solubility curve of the pentahydrate, with the transition point to the dihydrate at $T_2$. $T_3S_3$ is the solubility curve of the gelatinous hydrate which I have designated as the 4/3 hydrate and which is semi-stable only, being always supersaturated with respect to the other hydrates, as shown in the graph. There are numerous other hydrates of sodium thiosulphate which have their respective transition points, but as they are of minor or no importance in this process, they are omitted to avoid complication.

Like the thiocyanates, the thiosulphates have a strong tendency to supersaturation, as indicated by the dotted lines. There is also a tendency to superheat, as indicated for the pentahydrate by the dotted line $T_2R$.

The maximum boiling points are at the intersection of the boiling point curves with the solubility curves, viz at M for the thiocyanate and $M_1$ for the thiosulphate.

In order to complete the graph, the lowering of the freezing point curves is shown as $W_1U_1$ and $W_1U$ for the thiosulphate and thiocyanate, respectively, with cryohydric points at $U_1$ and U. These are the lowest temperatures which can be reached in the liquid condition, and represent the freezing temperatures of the respective eutectic mixtures.

While my process may be applied to the separation of the thiocyanates, such as the sodium or potassium thiocyanates, from solutions containing other impurities, such, for example, as various thiosulphates, such as the thiosulphates of sodium, potassium, etc., the process finds one of its more important commercial applications in the recovery of sodium thiocyanate from solutions containing sodium thiocyanate contaminated with various impurities obtained from certain gas purification processes. The process will therefore be specifically explained as carried out for the recovery of sodium thiocyanate from such byproduct gas purification liquors, but it is to be understood that the invention is not limited to its application to the treatment of these particular liquors, but may be otherwise applied.

Referring now particularly to the recovery of sodium thiocyanate from the byproduct liquors obtained from certain gas purification processes. In order to remove the sulphur compounds from certain manufactured gases, such as carbureted water gas, coke oven gas, etc., the gas is brought into contact with an alkaline solution which is continuously circulated and aerated. Sodium carbonate is usually employed as the alkali. The sulphur in the gas which is in the form of hydrogen sulphide, $H_2S$, reacts with the sodium carbonate, $Na_2CO_3$, to form sodium bicarbonate, $NaHCO_3$, and sodium hydrosulphide, NaHS. The sodium carbonate also reacts with the carbon dioxide, $CO_2$, which is present in the gas, to form sodium bicarbonate. When the resulting solution containing sodium bicarbonate and sodium hydrosulphide, together with unchanged sodium carbonate, is aerated, part of the sodium hydrosulphide is changed to sodium thiosulphate, $Na_2S_2O_3$. The remainder is decomposed back to sodium carbonate, water, carbon dioxide, and hydrogen sulphide. The regenerated solution of sodium carbonate is then used for further gas purification treatment. In addition to the hydrogen sulphide and carbon dioxide in the gas, there is present some cyanogen or hydrocyanic acid, HCN, which reacts to form sodium thiocyanate, NaCNS. In the above process of gas purification, there is an accumulation in the regenerated liquor, of sodium thiosulphate and sodium thiocyanate. Periodically this liquor is evaporated so as to crystallize out the sodium carbonate, which is again dissolved and used for gas purification. This crystallization is best conducted hot. The mother liquor from this crystallizing operation consists principally of a mixture of sodium thiosulphate, sodium thiocyanate, and certain impurities which impart a dark color. The sodium thiosulphate can be separated as the pentahydrate in a comparatively pure form from this mother liquor by cold crystallization, leaving a second mother liquor rich in sodium thiocyanate but containing some sodium thiosulphate, together with a relatively small amount of sodium carbonate or bicarbonate. For instance, such a mother liquor may contain in the neighborhood of 47% by weight of sodium thiocyanate, NaCNS, and 6% by weight of sodium thiosulphate, $Na_2S_2O_3$, 1% by weight of sodium carbonates, and traces of other impurities.

The present invention is particularly concerned in its herein specifically described embodiment, with the recovery of the sodium thiocyanate from this second mother liquor. The process is preferably carried out as follows:

This second mother liquor is concentrated by evaporation until the boiling temperature of the liquor is between 130 and 135° C. at 760 millimeters of mercury, or its equivalent at a different pressure. The concentrated solution is then cooled just below the transition point (48° C.) of the pentahydrate of sodium thiosulphate, and is "seeded" with crystals of a hydrate of sodium thiosulphate. The cooling is continued 15 to 20° C. below the transition point, the solution being stirred occasionally to promote the reaction. The solution is allowed to stand at this temperature for one or two days. The gelatinous precipitate of the thiosulphate, together with the entrapped finely divided matters and certain other highly colored impurities, is separted from the liquid by filtration, preferably aided by settling, at a temperature above the transition point of the hydrate ($NaCNS.2H_2O$) of the thiocyanate, i. e., 30° C., but below the transition point of the thiosulphate pentahydrate, i. e. 48° C. The filtrate is concentrated further by evaporation until its boiling point is approximately at the maximum boiling temperature of a saturated solution of the thiocyanate, viz, 153° C., for sodium thiocyanate. The concentrated liquor is then cooled slowly to just above the transition point of the pentahydrate of sodium thiosulphate, viz, 48° C., and the sodium thiocyanate crystallizes out in the anhydrous crystalline form. The crystals are separated from the mother liquor by settling and centrifuging. If care is taken to prevent inoculation with crystals of a hydrate of the thiosulphate, the temperature can be lowered to just above the transition temperature of the hydrate of sodium thiocyanate, viz, 30° C., with a proportionately increased yield of the anhydrous thiocyanate crystals. The danger of inoculation with the thiosulphate pentahydrate crystals is not very great if the solution is not agitated, due to the slow rate of "growth" of thiosulphate hydrate crystals. It is also possible to carry out operations below the transition temperature of the hydrate of the thiocyanate (as low as 25 to 20° C.), but in this case inoculation with thiocyanate hydrate crystals immediately results in contamination of the entire mass because of their rapid growth. If any of the hydrates start to separate, the trouble can be remedied by heating above the respective transition points. In fact, it is often advantageous to cool slowly to about 20 to 25° C. and then heat quickly to about 48° C., settle for a few minutes, and centrifuge, as the very small hydrate crystals dissolve before the large crystals of the anhydrous salt.

In Figure 2 of the drawings is illustrated schematically the preferred arrangement of apparatus for carrying out the process. In the illustrated embodiment, the crude thiocyanate liquor from which the greater part of the sodium thiosulphate has been crystallized, this liquor being the liquor hereinbefore referred to as the "second mother liquor", is stored in a tank A from which it is fed into the evaporator B. As before stated, this mother liquor consists principally of a solution of sodium thiocyanate contaminated with a small percentage of sodium thiosulphate and other salts and impurities. This thiocyanate liquor is concentrated in the evaporator B until the boiling temperature of the liquor is between 130 and 135° C. For the pure salt this corresponds to a gravity of about 1.30 at the boiling point temperature. The liquor contains approximately 60 to 63% by weight of the anhydrous sodium thiocyanate, NaCNS, which is equivalent to between 775 and 830 grams per liter of NaCNS at the boiling point. These relations are illustrated graphically in Figure 1. Because of the presence of thiosulphate and other impurities, the gravities, temperatures, etc. will in actual practice be a little different from the above figures. However, for operating purposes these figures are sufficiently accurate. In general, the tendency of the thiosulphate is to increase the gravity and to decrease the boiling point.

The concentrated liquor is run from the evaporator B into the settling tank L, which is provided with a jacket for cooling or heating, and an agitator. The liquor is cooled in L to a little below the transition temperature of the thiosulphate hydrate, "seeded" with a handful of small hydrate crystals, $Na_2S_2O_3 \cdot 5H_2O$, and the solution slowly agitated, until the temperature has reached about 40° C., with occasional additions of a few crystals of the thiosulphate hydrate. The specific gravity of the solution at this point should be about 1.37.

Cooling is continued until the temperature is not quite to that of the transition point of the hydrate of sodium thiocyanate, viz, 30° C. It is not harmful if a small amount of anhydrous crystals of the thiocyanate separate. In fact, the best results are obtained in the presence of a small amount of the anhydrous sodium thiocyanate. Cooling below 30° C. may cause crystals of the thiocyanate hydrate, $NaCNS \cdot 2H_2O$, to separate. Failure to cool below 35 to 40° C. may result in an insufficient separation of thiosulphate and other impurities. Ordinarily, the best temperature is between 35 and 40° C. The specific gravity of the viscous gelatinous precipitate, together with the entrapped impurities and some hard crystals of anhydrous sodium thiocyanate and hard crystals of sodium thiosulphate hydrates, is slightly greater than that of the liquid, and if the mixture is allowed to stand for a day or more, this material will sink to the bottom of the settling tank L. In this way it is possible to avoid running the entire mixture at one time through the filter press J, which is the next operation. The supernatant liquid can be filtered very rapidly. The viscous subnatant mixture is very slow filtering. If they were not first separated by settling, the entire mixture would be difficult to filter. Bypass piping is shown in Figure 2, indicating a method of making this partial separation.

The clean liquor is run from the filter press back into the evaporator B, or into the sump tanks H from whence it is pumped by means of a pump I into the evaporator B; or through the filter press J if re-filtering is required; or it may be pumped into the crystallizer C, which is provided with a steam jacket and is capable of serving as an evaporator where only a slight amount of concentration is required. Suitable piping for accomplishing any of these operations is indicated in the schematic drawing, Figure 2. For the sake of illustration, the liquor will be considered as run back to the evaporator B, where it is concentrated until the boiling temperature of the liquid has reached the maximum, or about 153° C. This corresponds to about 76% by weight of the anhydrous sodium thiocyanate, NaCNS, and has a specific gravity at this temperature of about 1.39. From this second evaporation in the evaporator B, the liquor is run to the crystallizer C and slowly cooled, as hereinbefore described, for example, as follows: cooled slowly to about 25° C. without agitation; then warmed quickly with agitation to just above 48° C.; allowed to settle for a few minutes; and the crystals separated from the supernatant liquor and discharged through the chute into the centrifuge D. Here the crystals are separated from the clinging mother liquor which is run into the sump tanks H. The supernatant mother liquor in C may be also run through the centrifuge D for the separation of the small amount of crystals which remain in suspension. However, it is preferable to bypass directly into the sump tanks H as shown in the drawing. The dried anhydrous sodium thiocyanate crystals in the centrifuge basket are large and well formed and can be washed with a little water at about 35° C. The crystals from the centrifuge D are dumped into a barrel N and transferred to storage or suitable packages G, which should be air-tight, as the anhydrous salt is hydroscopic.

The general physical properties of the anhydrous sodium thiocyanate are as follows. The melting point is close to 302° C. The salt expands on fusion. On cooling, it solidifies at the same temperature to a hard crystalline mass, having apparently the same specific gravity as the salt prepared from the aqueous solution, namely, a specific gravity of 1.64 at 25°/4° C. The anhydrous salt prepared by this process is in the form of hard uniform rhombic crystals, snow-white in appearance, hydroscopic, very soluble in water and alcohol, and but slightly soluble in ether and benzol. In case it is desired to purify further the thiocyanate, recrystallization is employed. This is carried out by dissolving the anhydrous crystals in the crystallizer C with a little water. The crystallizer C is equipped with a steam jacket for this purpose. If desired, the thiocyanate solution can be settled in the settling tank L and run through the filter press J, concentrated to a boiling temperature of about 153° C. in either the evaporator B or crystallizer C, and then recrystallized in the crystallizer C and dried in the centrifuge D, as previously described, the liquor being worked up with the next batch. Or, depending on the purity of the material, the thiocyanate salt may be simply dissolved in the crystallizer C at the maximum saturation temperature, of about 153° C., cooled directly in the crystallizer C, as previously described, and centrifuged in the centrifuge D.

The operation of re-crystallization may be repeated in a like manner, as often as desired, but usually further recrystallization is not required.

The mother liquors accumulated in the sump tanks H are pumped by means of the pump I to the evaporator B, and either alone or with the addition of fresh liquor from the storage tank A, are subjected to the same operations for the recovery of additional crops of the salts. There is no appreciable building up of impurities in the mother liquors, which is an advantage.

The residual filter cakes from the filter press J, which contain chiefly thiosulphates, thiocyanates, carbonates, free sulphur, free carbon, organic material, iron compounds, etc., can be either discarded or worked up separately, or returned to the original thiosulphate process from which the second mother liquor is obtained. In working up the residual filter cakes, which are usually black in color, for recovery of additional thiocyanates and thiosulphates, it has been found advantageous to first dry thoroughly at a temperature of about 200° C. This breaks up colloidal matter and certain organic compounds, making it possible to remove the more objectionable impurities by means of filtration. In a small plant, the amount of black filter cakes is not of sufficient volume to warrant working up, in which case it is best to discard or burn for its sulphur content, which is high.

While I have specifically described and diagrammatically illustrated the preferred steps and their sequence in carrying out my process, and have suggested by way of examples, types of apparatus, temperature, and concentration control conditions, it will be obvious to those skilled in the art that many variations may be made without departing from the essence of the invention. For example, vacuum evaporators may be employed; various types of filtering apparatus can be substituted for the centrifuge and filter press; and, furthermore, the process may be applied to the separation of thiocyanates from other substances, or the separation of other substances from thiosulphates. It is therefore to be understood that that the invention is not limited to its preferred embodiment or to the details of the foregoing description, but may be otherwise embodied within the scope of the following claims.

I claim:

1. That step in the process of recovering a thiocyanate, which consists in beginning the crystallization of the thiocyanate near the temperature of maximum boiling point of a saturated solution, substantially as described.

2. That step in the process of recovering a thiocyanate from a solution containing a thiosulphate, which consists in forming a gelatinous thiosulphate hydrate, substantially as described.

3. That step in the recovery of thiocyanates from a solution containing finely divided material, which consists in the formation of a gelatinous hydrate capable of entrapping the finely divided impurities, substantially as described.

4. Those steps in the recovery of thiocyanate from a solution containing the thiocyanate and a thiosulphate, which consist in forming a gelatinous precipitate of the thiosulphate, and separating the precipitate from the solution, substantially as described.

5. Those steps in the process of recovering a thiocyanate from a solution containing the thiocyanate, a thiosulphate, and finely divided impurities, which consist in forming a gelatinous precipitate and separating the precipitate together with entrapped impurities from the solution, substantially as described.

6. That step in the process of recovering sodium thiocyanate from a solution containing sodium thiocyanate and sodium thiosulphate, which consists in forming a gelatinous precipitate of sodium thiosulphate, substantially as described.

7. Those steps in the process of recovering an alkali thiocyanate, which consist in concentrating an aqueous solution containing the thiocyanate to near its maximum boiling point, and then cooling so as to cause the crystallization from the solution of the anhydrous salt, substantially as described.

8. Those steps in the process of recovering sodium thiocyanate, which consists in concentrating a solution containing sodium thiocyanate to near its maximum boiling point, and cooling the solution so as to cause the crystallization therefrom of anhydrous sodium thiocyanate, substantially as described.

9. Those steps in the process of recovering sodium thiocyanate from a solution containing sodium thiocyanate, sodium thiosulphate, and finely divided impurities, which consist in the formation of a gelatinous precipitate of sodium thiosulphate capable of entrapping the impurities, and separating the precipitate and entrapped impurities from the solution, substantially as described.

10. Those steps in the process of recovering sodium thiocyanate from an aqueous solution, which consists in concentrating the solution to near its maximum boiling point, and then cooling the solution so as to cause a crystallization of the anhydrous salt, substantially as described.

11. Those steps in the process of recovering an alkali thiocyanate from an aqueous solution, which consist in concentrating the solution to near its maximum boiling point, and then cooling the solution so as to cause the crystallization of the anhydrous thiocyanate salt, substantially as described.

12. Those steps in the process of recovering alkali thiocyanates from solutions containing alkali thiocyanates and alkali thiosulphates, which consist in evaporating the solution to a liquid temperature above the maximum boiling point of the alkali thiosulphate, cooling below the transition temperature of the pentahydrate of the alkali thiosulphate so as to cause the formation of a gelatinous hydrate of the alkali thiosulphate, and separating the gelatinous hydrate from the thiocyanate liquor, substantially as described.

13. Those steps in the process of recovering sodium thiocyanate from aqueous solutions containing sodium thiocyanate and sodium thiosulphate, which consist in concentrating the solution to a concentration greater than the maximum solubility of the sodium thiosulphate, cooling below the transition temperature of the pentahydrate of the thiosulphate so as to cause a gelatinous precipitate of the thiosulphate, and separating the precipitate from the thiocyanate liquor, substantially as described.

14. The herein described process of recovering sodium thiocyanate from aqueous solutions containing sodium thiocyanate and sodium thiosulphate, which consists in concentrating the solution until its boiling point at 760 millimeters of mercury is above 126° C. or its equivalent at other pressures, cooling to below 48° C., so as to cause a gelatinous precipitate of a sodium thiosulphate hydrate, separating the precipitate, concentrating the filtrate to about the maximum boiling point of sodium thiocyanate in aqueous solution, and cooling so as to cause the crystallization of anhydrous sodium thiocyanate, substantially as described.

15. The process of recovering sodium thiocyanate from aqueous solutions containing sodium thiocyanate, sodium thiosulphate, and finely divided impurities, which consists in concentrating the solution until its boiling temperature at 760 millimeters of mercury or its equivalent at other pressures, is about 130 to 135° C., cooling to between the transition points of sodium thiosulphate pentahydrate and sodium thiocyanate hydrate, and seeding with crystals of a hydrate of sodium thiosulphate to thereby cause a gelatinous precipitate of sodium thiosulphate capable of entrapping the finely divided impurities, separating the gelatinous precipitate with the entrapped impurities, concentrating the filtrate until its boiling temperature is in the neighborhood of the boiling temperature of a saturated solution of sodium thiocyanate cooling so as to cause the crystallization of anhydrous sodium thiocyanate, and separating the sodium thiocyanate crystals from the mother liquor, substantially as described.

16. Those steps in the process of separating an alkali thiosulphate and finely divided impurities from a solution, which consist in forming a gelatinous hydrate of the thiosulphate capable of entrapping the finely divided impurities, and separating the precipitate and entrapped impurities from the solution, substantially as described.

17. Those steps in the separation of sodium thiocyanate from a solution containing it together with other salts and finely divided impurities, which consist in concentrating the solution, and cooling it to a temperature such as to cause the formation of a gelatinous hydrate of the sodium thiosulphate capable of entrapping the finely divided impurities, and separating the gelatinous precipitate together with entrapped impurities from the solution, substantially as described.

In testimony whereof I have hereunto set my hand.

MARC DARRIN.